UNITED STATES PATENT OFFICE.

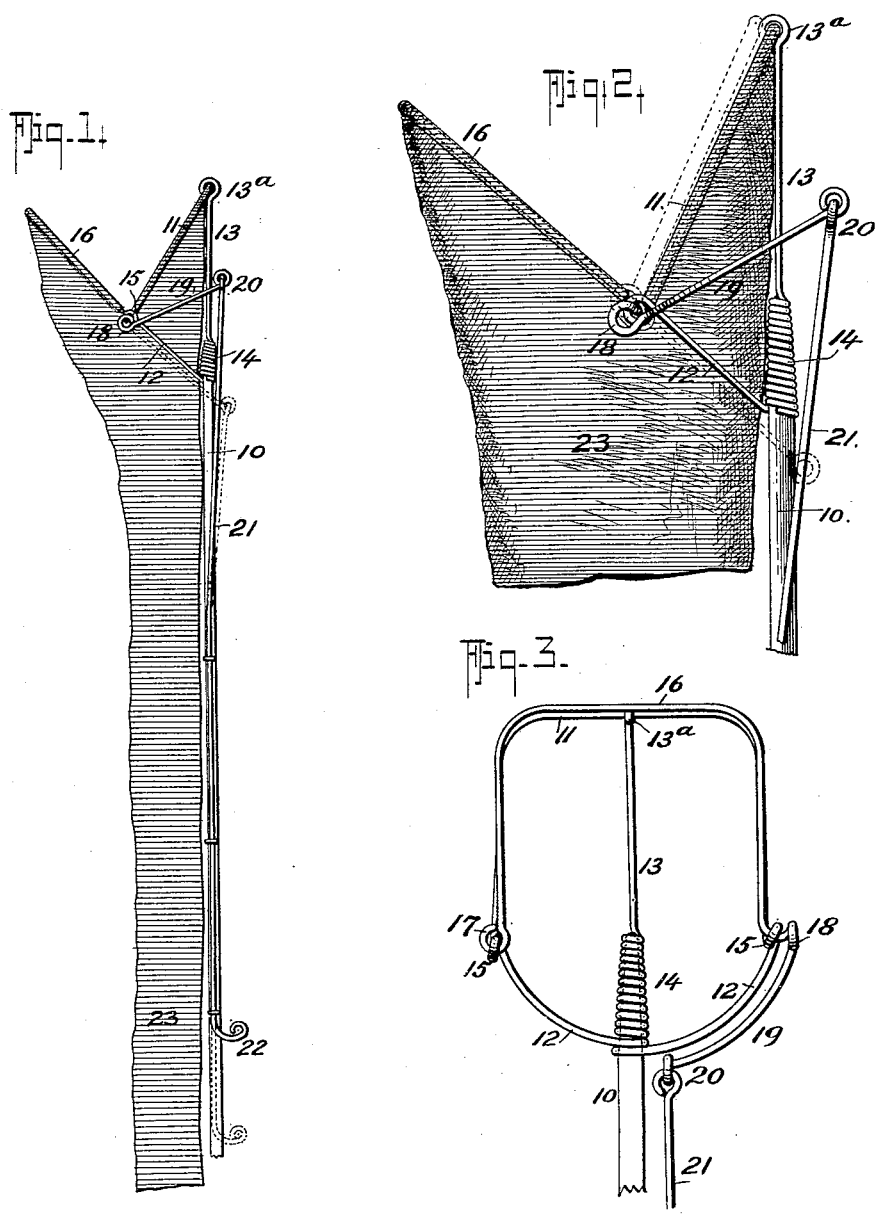

ROBERT ALEXANDER ANDERSON, OF MOUNT LEHMAN, CANADA.

FRUIT-PICKER.

SPECIFICATION forming part of Letters Patent No. 602,551, dated April 19, 1898.

Application filed November 20, 1897. Serial No. 659,293. (No model.)

*To all whom it may concern:*

Be it known that I, ROBERT ALEXANDER ANDERSON, a citizen of the Dominion of Canada, residing at Mount Lehman, in the Province of British Columbia, Canada, have invented certain new and useful Improvements in Fruit-Pickers, of which the following is a specification.

This invention relates to improvements for gathering fruit; and it has for its object to provide a device for this purpose of a very cheap, simple, and effective construction and which can be easily manipulated to gather the fruit from the tree without bruising or in any way damaging the same.

The invention consists in certain details of construction and combination of parts, such as will be first described in detail, and then be specifically pointed out in the appended claims, reference being had to the accompanying drawings, in which—

Figure 1 is a side elevation of my improvement, the jaws being shown open. Fig. 2 is a similar view, on an enlarged scale, of the upper end of the device, the jaws being shown open by full lines and closed by dotted line. Fig. 3 is a front view of the jaw mechanism, the cloth covering or tubing which receives the fruit being removed.

Referring now to the accompanying drawings, in which similar parts are indicated by like numerals in all of the figures, 10 indicates a pole or shaft to which my improvements are attached, such improvements comprising a jaw 11, fixedly secured to the upper end of the pole and supported by a brace portion 12.

The jaw 11, together with the brace member and the means for securing such jaw to the end of the pole, is formed of a single wire member, one end of which has an eye or loop 13ª and a straight or tie portion 13, which terminates in the coil 14, which forms a socket for the tapering end of the pole 10, such coil portion 14 terminating in an outwardly-curved brace, which forms one of the brace portions 12, and at a suitable point such portion 12 is bent into an eye 15 and then extended upward parallel with the tie portion 13, bent over at right angles and then outward to form the jaw proper, its downwardly-bent member being formed with an eye 15 and an inwardly-curved portion which forms the opposite brace 12, the lower end of which is looped about the upper end of the pole, as shown most clearly in Fig. 2.

By forming the jaw 11 and the branches 12, the securing-socket 14, and the tie member 13 of a single piece of wire bent to the form shown in the drawings the hinge portion or eyes 15 are deflected over the plane of the pole. This has the effect that, although the hinge-support is arranged some distance from the pole 10, such said hinge is rigid by reason of its being braced from two sides— namely, from the jaw 11 and the brace 12.

Arranged in the opposite eyes 15 of the jaw is a swinging jaw 16, also formed of a single wire member. This jaw is formed by securing one end thereof to one of the eyes 15 by loops 17 and following the contour of the rigid jaw 11 and passing the said wire through the opposite loop 15, and to provide against undue vibration in the said connection the jaw 16 is formed of a sharp loop 18 at a point where it passes through the eye 15, which loop also acts as a keeper and prevents the jaw from being removed from its proper position.

The free end of the jaw 16 terminates in the pendent wire, which is carried beneath and at about the same contour as the adjacent brace member 12 and forms a lever 19, the lower end of which is secured by means of the loop 20 to the connecting-rod 21, which is operated from the lower end of the pole 10 by a suitable handle 22.

A suitable tubing of cloth is secured to the jaws 11 and 16 by hemming the wires within the cloth to form the mouth of the same. This presents a soft and uninjurious surface to the ripe fruit when being detached from the trees.

From the foregoing description, taken in connection with the accompanying drawings, it is thought that the operation and advantages of my improvement will be readily apparent.

It will be observed that in operation the mouth of the apparatus, formed by the jaws 11 and 16, when it is placed beneath the fruit, by drawing the handle down, such movement, by reason of its connection with the lever 19, will bring the jaw 16 in close proximity with the jaw 11, as shown in dotted lines, and by a backward movement on the pole 10 the fruit is detached and received into the tubing 23, from where it gravitates to the ground or into a suitable receptacle through an opening in the pendent end of said tube.

In practice it is preferable to have the tube 23 unattached for some distance along the lower end of the pole. The person operating the device can then deposit the fruit where desired by movement of the same.

Having thus described my invention, what I claim, and desire to secure by Letters Patent, is—

1. A fruit-picker, comprising a fixed jaw having means for securing it to the upper end of the pole, the lower end of said jaw being deflected outward from the plane of the pole, and carrying hinge members, and braces connected with such pole, of a jaw pivotally hung in the hinge members of the fixed jaw, said hinged jaw having a lever-arm and an operating-rod connected with such lever-arm extended within convenient reach of the operator, substantially as shown and described.

2. As an improvement in fruit-pickers, the combination of a fixed jaw consisting of a single wire member bent to form a jaw portion proper, having hinge loops or eyes, brace members 12 and 13, and a socket 14, in combination with the jaw 16 pivotally hung in the hinge-eyes of the fixed jaw, said jaw 16 having a lever-arm 19 and means for operating such lever, substantially as shown and described.

3. In a fruit-picker, the combination with the pole 10, the fixed jaw 11, having integral hinge or eye members 15, and brace members 12 projected in a plane from the pole, one of said brace members 12, being formed with a spiral loop 14 terminating in a brace member 13 connected with the upper or cross bar of the jaw 11 proper, the other member 12 being secured to the pole 10, of the jaw 16, formed of a single wire member having one end terminating in an eye 17 engaging one of the loops 15, of the jaw 11, the other end of such jaw 16 passing through the fixed loop 15 of the jaw 11, bent into an eye 18 and engaging the lever member 19 and the operating-rod 21, all being arranged substantially as shown and for the purposes described.

ROBERT ALEXANDER ANDERSON.

Witnesses:
W. G. TRETHEWEY,
L. G. MUNN.